(12) United States Patent
Carney et al.

(10) Patent No.: US 11,163,760 B2
(45) Date of Patent: Nov. 2, 2021

(54) PROVIDING A DATA QUERY SERVICE TO A USER BASED ON NATURAL LANGUAGE REQUEST DATA

(71) Applicant: MASTERCARD INTERNATIONAL INCORPORATED, Purchase, NY (US)

(72) Inventors: Timothy Scott Carney, O'Fallon, MO (US); Neelima R. Arumalla, Chesterfield, MO (US); Charlene R. Ramer, St. Peters, MO (US); Matthew Thomas Wilkerson, Troy, IL (US); Timothy B. Higgins, Moscow Mills, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 132 days.

(21) Appl. No.: 16/717,062

(22) Filed: Dec. 17, 2019

(65) Prior Publication Data

US 2021/0182283 A1   Jun. 17, 2021

(51) Int. Cl.
*G06F 16/248* (2019.01)
*G06F 16/242* (2019.01)
*G06F 16/9035* (2019.01)
*G06F 16/2455* (2019.01)

(52) U.S. Cl.
CPC ........ *G06F 16/2428* (2019.01); *G06F 16/243* (2019.01); *G06F 16/248* (2019.01); *G06F 16/24564* (2019.01); *G06F 16/9035* (2019.01)

(58) Field of Classification Search
None
See application file for complete search history.

(56) References Cited

U.S. PATENT DOCUMENTS

| | | | |
|---|---|---|---|
| 7,613,719 B2 | 11/2009 | Chang et al. | |
| 7,747,601 B2 | 6/2010 | Cooper et al. | |
| 7,752,197 B2 | 7/2010 | Dellinger et al. | |
| 8,447,771 B2 | 5/2013 | Kearsey et al. | |
| 8,862,458 B2 | 10/2014 | Freising et al. | |
| 8,938,436 B2 | 1/2015 | Kozempel | |
| 9,652,451 B2 | 5/2017 | Elder | |
| 2013/0198166 A1 | 8/2013 | Prout et al. | |
| 2016/0063118 A1* | 3/2016 | Campbell | G06F 16/9535 707/722 |

(Continued)

*Primary Examiner* — Wilson Lee

(57) ABSTRACT

The disclosure herein describes providing a data query service to a user based on natural language request data. The natural language request data is obtained from a user interface and a query structure is populated based on the natural language request data. The query structure is compared to stored queries and, based on identifying a stored query that matches the query structure, the user is prompted to confirm or reject that the identified query be performed. Based on receiving a confirmation of the identified query from the user, the identified query is selected for performance. Alternatively, based on receiving a rejection of the identified query from the user, a query based on the query structure is generated and selected for performance. The selected query is then performed on at least one data source and query output from the performed query is provided to the user.

20 Claims, 9 Drawing Sheets

(56) References Cited

U.S. PATENT DOCUMENTS

| | | | |
|---|---|---|---|
| 2016/0188702 A1* | 6/2016 | Lee-Goldman | G06F 16/3322 |
| | | | 707/749 |
| 2016/0246847 A1* | 8/2016 | Jung | G06F 16/24575 |
| 2017/0052681 A1* | 2/2017 | Higgins | G06F 3/12 |
| 2020/0004884 A1* | 1/2020 | Gibson | G06F 16/9535 |
| 2020/0394260 A1* | 12/2020 | Wu | G06F 16/953 |
| 2021/0089571 A1* | 3/2021 | Perone | G06F 40/30 |
| 2021/0112178 A1* | 4/2021 | Perone | G06F 40/35 |

* cited by examiner

PROVIDING A DATA QUERY SERVICE TO A USER BASED ON NATURAL LANGUAGE REQUEST DATA

BACKGROUND

In modern businesses, making business decisions often requires accessing and analyzing data. However, many of the people that make the decisions are not data experts. Such non-expert users are not knowledgeable about databases and/or other data structures and they may not know which data fields to search, which data source to access, and/or how to create a query that will retrieve the data they need. As a result, many such users have to log data requests with an expert or experts to have an ad hoc query created and executed. Such requests require substantial time, which may result in less responsive decision-making due to waiting on crucial data. Further, data experts are occupied with answering data requests by creating ad hoc queries when they could otherwise be working on other projects. Some larger organizations maintain teams of data experts that may receive thousands of such data requests in a given year.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing a data query service to a user based on natural language request data is described. The natural language request data is obtained from a user interface and a query structure is populated including at least one query parameter based on the natural language request data. The populated query structure is compared to at least one stored query and, based on identifying a stored query that matches the query structure, the user is prompted, via the user interface, to confirm or reject that the identified query be performed, wherein prompting the user includes providing performance data associated with at least one past performance of the identified query. Based on receiving a confirmation of the identified query from the user, the identified query is selected for performance. Alternatively, based on receiving a rejection of the identified query from the user or failing to identify a stored query that matches the query structure, a query based on the query structure is generated and, based on generating the query based on the query structure, the generated query is selected for performance. The selected query is then performed on at least one data source and query output from the performed query is provided to the user.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for providing a data query service to a user based on natural language request data. A natural language request is obtained from a user interface and a query structure, including query parameters, is populated based on the obtained natural language request. The populated query structure is compared to stored queries and, based on identifying a stored query that matches the query structure, the user is prompted to confirm or reject that the identified query should be performed. The prompt to the user includes performance data associated with the identified query for evaluation by the user. If the user confirms the query, it is performed. Alternatively, if the user rejects the identified query, a query is generated based on the query structure and performed. The query output from the performed query is then provided to the user.

The disclosure addresses the challenges of enabling non-expert users of the system to provide requests for data in natural language through the use of question-and-answer sessions with a natural language engine and providing those users query results from a query microservice in response to the provided requests. As described herein, the system is configured to use natural language processing and the context of questions asked by the natural language engine to determine the structure of a query that would likely suit the user's data needs. Further, the disclosure operates in an unconventional way by using the determined query structure to search for a stored query or queries that may provide the data that the user is looking for and the module that "matches" the stored queries to the query structure is trained using machine learning techniques, such that the accuracy of matching query identification improves over time as the system is used. Additionally, the system is configured to provide performance data about stored queries and/or predicted performance data about newly-generated queries based on logged performance data from past performances of similar queries. The module that predicts performance data for queries is also trained using machine learning techniques, such that the accuracy of the performance predictions also improves over time as the system is used. The performance data may be provided to the user for evaluation when the user is deciding whether or not a query meets their needs. All these features combine to enable users who are not data experts to request data sets that they need to make business decisions using natural language in a guided, automated interaction, evaluate resulting queries including provided performance data, and efficiently obtain accurate query results that include the data they are looking for.

Figure 1:
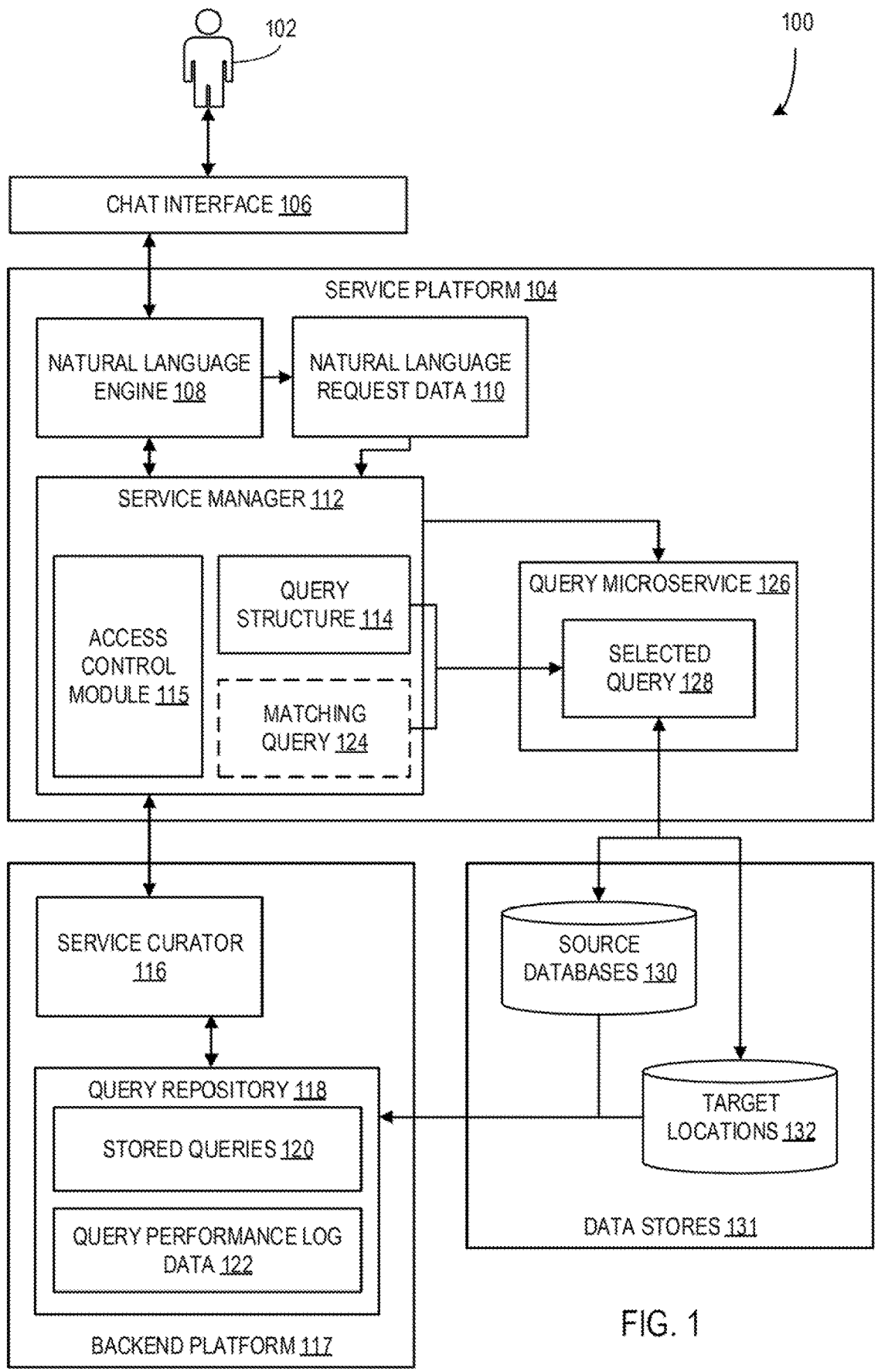
FIG. 1 is a block diagram illustrating a system configured for providing a query microservice based on a user's natural language request data according to an embodiment.

FIG. 1 is a block diagram illustrating a system 100 configured for providing a query microservice 126 based on a user 102's natural language request data 110 according to an embodiment. The system 100 includes a service platform 104 that provides a chat interface 106 for use by the user 102, a backend platform 117 configured to curate and/or analyze query structures and stored queries that have been previously created, and data stores 131 that include the databases or other data structures upon which the queries are executed.

In some examples, the service platform 104 is a cloud-based platform that is distributed across multiple servers or other computing devices and accessible by the user 102 via a network connection. It should be understood that the service platform 104 may be configured and/or implemented as a cloud-based or otherwise distributed platform in other ways without departing from the description. In further examples, the backend platform 117 and/or the data stores 131 are implemented as separate platforms from the service platform 104 and are accessible to the service platform 104 by network connections or the like. Alternatively, while the service platform 104, backend platform 117, and data stores 131 are illustrated as being separate from each other in system 100, in other examples, the components of the service platform 104, the backend platform 117, and/or the data stores 131 may be configured and/or implemented as parts of the same platform without departing from the description herein.

The service platform 104 includes a natural language engine 108 (e.g., a "chat bot") that is configured to interact with the user 102 via the chat interface 106 to obtain natural language request data 110 and a service manager 112 that uses the natural language request data 110 to generate or otherwise determine a query structure 114. The service manager 112 is further configured to communicate and/or interact with the service curator 116 of the backend platform 117 and to generate a query microservice 126 for performing a selected query 128 on the source databases 130 and/or target locations 132 of the data stores 131. Additionally, in some examples, the service manager 112 includes an access control module 115 configured to enforce access control rules that determine which data a user 102's query is able to access from the data stores 131.

The natural language engine 108 includes hardware, firmware, and/or software configured to communicate with users via the chat interface 106 and collect natural language request data 110 from those communications. The chat interface 106 may be configured as a message exchange interface that enables the user 102 and the natural language engine 108 to exchange messages back and forth (e.g., the natural language engine 108 posts questions in the chat interface 106 and the user 102 responds to the posted questions with answers in the chat interface 106). The natural language request data 110 is collected from the chat interface 106 by the natural language engine 108 based on the messages exchanged between the user 102 and the natural language engine 108. An exemplary exchange of messages in a chat interface is provided below with respect to FIGS. 5A-5D.

In some examples, the natural language engine 108 is configured to respond to answers received from the user 102 with defined questions. For instance, if a question asked by the natural language engine 108 requests a "yes" or "no" answer and the user 102 responds with a "yes" answer, the natural language engine 108 may be configured to ask a first question in response to the "yes" answer and, alternatively, if the user 102 responds with a "no" answer, the natural language engine 108 may be configured to ask a second question in response to the "no" answer. The determination of which questions to ask by the natural language engine 108 may be based on a tree or other similar structure of potential questions, such that each question is represented by a node of the tree and the user's answer to the question is used to determine which branch to traverse from the node of the question that was asked. For instance, a question node may be associated with a question that asks the user whether they know a specific data table or source they would like to use for their query. If the user says "yes", the natural language engine 108 follows the "yes" branch to a question that asks the user to provide the name of the specific data table or source. Alternatively, if the user says "no", the natural language engine 108 follows the "no" branch to a question that asks the user to provide other data associated with the desired query.

Additionally, or alternatively, the natural language engine 108 may be configured to identify keywords and/or patterns of words in the answers provided by the user 102 and determine a question or questions to ask the user 102 based on the identified keywords and/or patterns. For instance, if the user 102's answer to a question includes a comma-separated list of strings or words that closely fit the pattern of data fields that may be incorporated into a query, the natural language engine 108 may be configured to ask a question that confirms with the user 102 that the listed items are intended to be such data fields. In further examples, the natural language engine 108 and service manager 112 are configured to interact to provide a predicted portion of query structure and/or query syntax (e.g., the specific names of data fields that are most likely to represent the items in the list) based on the listed items with a question that confirms with the user 102 that the predicted portion is what the user 102 intended.

It should be understood that the natural language engine 108 may be configured and/or implemented using any known natural language engine and/or natural language processing application or similar software without departing from the description herein.

The natural language request data 110 includes some or all of the data associated with answers provided by the user 102 via the chat interface 106. Further, the natural language request data 110 may include data associated with the questions asked or prompts provided by the natural language engine 108. For instance, answer data from the user 102 may be arranged or grouped based on the questions to which portions of the answer data were provided. Such question or prompt-based data may be used by the service manager 112 as contextual information when the service manager 112 determines or generates the query structure 114 based on the natural language request data 110.

The service manager 112 includes hardware, firmware, and/or software configured for receiving the natural language request data 110 and generating, populating, and/or determining the query structure 114 therefrom. The service manager 112 is configured to analyze the natural language request data 110 and convert that data in a query structure 114 by identifying patterns in the natural language request data 110 and/or applying defined rules to the natural language request data 110. For instance, the service manager 112 may be configured to identify indications of data sources from which the query is to access data, target locations that the query is to change, data fields the query is to request, and/or filters or rules that are to be used to focus the query on a subset of data (e.g., data within a particular date range or data tuples that include a data value that exceeds a threshold).

Further, service manager 112 includes an access control module 115 configured to enforce access control rules (e.g., a "traffic cop" module for queries that users request). In some examples, the access control module 115 is configured to compare the identity of the user 102 and any associated credentials (e.g., credentials provided by the user 102 during communication with the natural language engine 108 or otherwise obtained by the service manager 112 based on the user's identity) to defined access control rules to determine which data in the data stores 131 the user can access. The enforcement of the access control rules may result in limitations being placed in the query structure 114 or limits otherwise being enforced on the data that is returned to the user as a result of the performance of the associated query (e.g., selected query 128). In some examples, the user 102's identity and credentials may affect how the query structure 114 is generated (e.g., the service manager 112 is configured to only build a query structure 114 for a querying data that the user 102 is able to access based on the access control rules). Such access control rules may be based on the user's unique identity, a group or category to which the user 102 belongs (e.g., a security level assigned to the user 102), a date range or time range, or the like. It should be understood that the access control module 115 may be configured to enforce an access control scheme in other ways without departing from the description herein.

The service manager 112 is further configured to communicate and/or interact with the service curator 116 of the backend platform 117. The service curator 116 includes hardware, firmware, and/or software configured for tracking and storing queries that are generated by the service manager 112 and/or through other means (e.g., stored queries 120 in the query repository 118), storing query performance log data 122 and other query performance information, and for comparing and/or matching query structures 114 generated by the service manager 112 to existing stored queries 120 to determine if a query matching a query structure 114 already exists (e.g., a matching query 124).

The service curator 116 is configured to receive a generated query structure 114 and/or data associated therewith and compare it to one or more stored queries 120. The comparison may be based on some or all of the elements or parameters in the query structure 114 (e.g., specific data fields to be obtained, specific data fields to change, and/or specific filters, limits, or thresholds to place on the query). In some examples, the service curator 116 includes a defined match threshold such that, if a percentage of parameters of a stored query 120 that match the query structure 114 exceed the defined match threshold, the stored query 120 is considered to match the query structure 114. The matching query (e.g., matching query 124) is provided to the service manager 112 and may be further provided to the user 102 for evaluation as described herein.

Based on identifying a matching query 124, the service curator 116 may access query performance log data 122 associated with the matching query 124 and provide that information to the service manager 112 and/or the user 102 for use in evaluating the matching query 124. In some examples, the query performance log data 122 includes elapsed time for performance of the matching query 124, quantity of tables accessed by the query 124, quantity of data or average quantity of data changed or retrieved by the query 124, or the like. Additionally, or alternatively, the query performance log data 122 of the matching query 124 may be provided along with query performance log data 122 of other similar queries to enable a comparison of various performance values and/or statistics.

If the service curator 116 does identify a matching query 124, it sends the matching query 124 to the service manager 112 (as illustrated in FIG. 1) and the service manager 112 is configured to select one of the matching query 124 or a query based on the query structure 114. Alternatively, or additionally, the service manager 112 may select a query that is based on either the query structure 114, the matching query 124, and/or input from the user 102 to be the selected query 128. In some examples, the service manager 112, via the natural language engine 108 and chat interface 106, communicates with the user 102 to provide the matching query 124 and associated information (e.g., the query performance log data 122) to the user 102 for evaluation. The user 102 is enabled to confirm that the matching query 124 fully matches the user 102's requirements or to reject the matching query 124 if it does not fit all or enough of the requirements. If the user 102 confirms the matching query 124, it is used as the selected query 128 for performance via a query microservice 126 generated by the service manager 112. Alternatively, if the user 102 rejects the matching query 124, the service manager 112 may generate a query from the query structure 114 and provide that query to the user 102 for evaluation as well.

In further examples, the service manager 112, via the natural language engine 108, obtains information from the user 102 about specific deficiencies in the matching query 124 or the query generated from the query structure 114 when those queries are evaluated by the user 102. Through analysis of this obtained information, the service manager 112 is configured to generate an adjusted query that reflects changes to the matching query 124 and/or the query generated from the query structure 114 and that adjusted query is provided to the user 102 for evaluation. The service manager 112 and natural language engine 108 may be configured to continue to adjust the query and provide the result for evaluation by the user 102 until the user 102 confirms a provided query.

Once a query has been confirmed as the selected query 128, the service manager 112 generates or otherwise creates a query microservice 126 using the selected query 128 (e.g., the service manager 112 functions as a "service factory"). the selected query 128 is then performed via the query microservices 126 on the data stores 131 as indicated in the selected query 128. It should be understood that the query 128 may be in any known query language and may be performed in other ways without departing from the description herein. The use of a query microservice 126 to perform the selected query 128 provides flexibility, efficient resource usage, and it enables each microservice 126 to be custom-generated based on the specific selected query 128.

The source databases 130 and target locations 132 of the data stores 131 include data storage hardware, firmware, and/or software configured for storing data. In some examples, the data stores 131 include a plurality of data storage devices, such as servers or other computing devices, that are cloud-based or otherwise distributed across a computer network. Alternatively, the data stores 131 may include one or more data storage devices located in substantially the same location without departing from the description herein. Further, while illustrated separately, it should be understood that the source databases 130 and target locations 132 represent locations within the data stores 131 from which the selected query 128 accesses and/or retrieves data and to which the selected query 128 writes and/or updates data respectively (e.g., the selected query 128 reads data from a source database 130 and writes the read data to a target location 132). For other selected queries, the source databases 130 and target locations 132 may include different locations or even overlapping locations without departing from the description herein.

In some examples, after a user 102 has provided the natural language request data 110 and confirmed a query associated therewith as a selected query 128, the system 100 is configured to send a question to the user via the chat interface 106 that asks the user 102 whether the selected query 128 should be saved for future use or discarded. If the user 102 chooses to save the selected query 128, it is saved in the stored queries 120 in the query repository 118. Alternatively, if the user 102 chooses to discard the query, it is not saved with the stored queries 120. In further examples, the service curator 116 is configured to provide a recommendation as to whether the selected query 128 should be saved based on the comparison of the query to the other stored queries 120 and/or query performance log data 122 indicating frequencies with which other stored queries 120 are reused. That recommendation may be provided to the user 102 when the user 102 is asked whether to save or discard the selected query 128 to inform the user 102 about the likelihood that the selected query 128 will be useful to others in the future.

Figure 2:
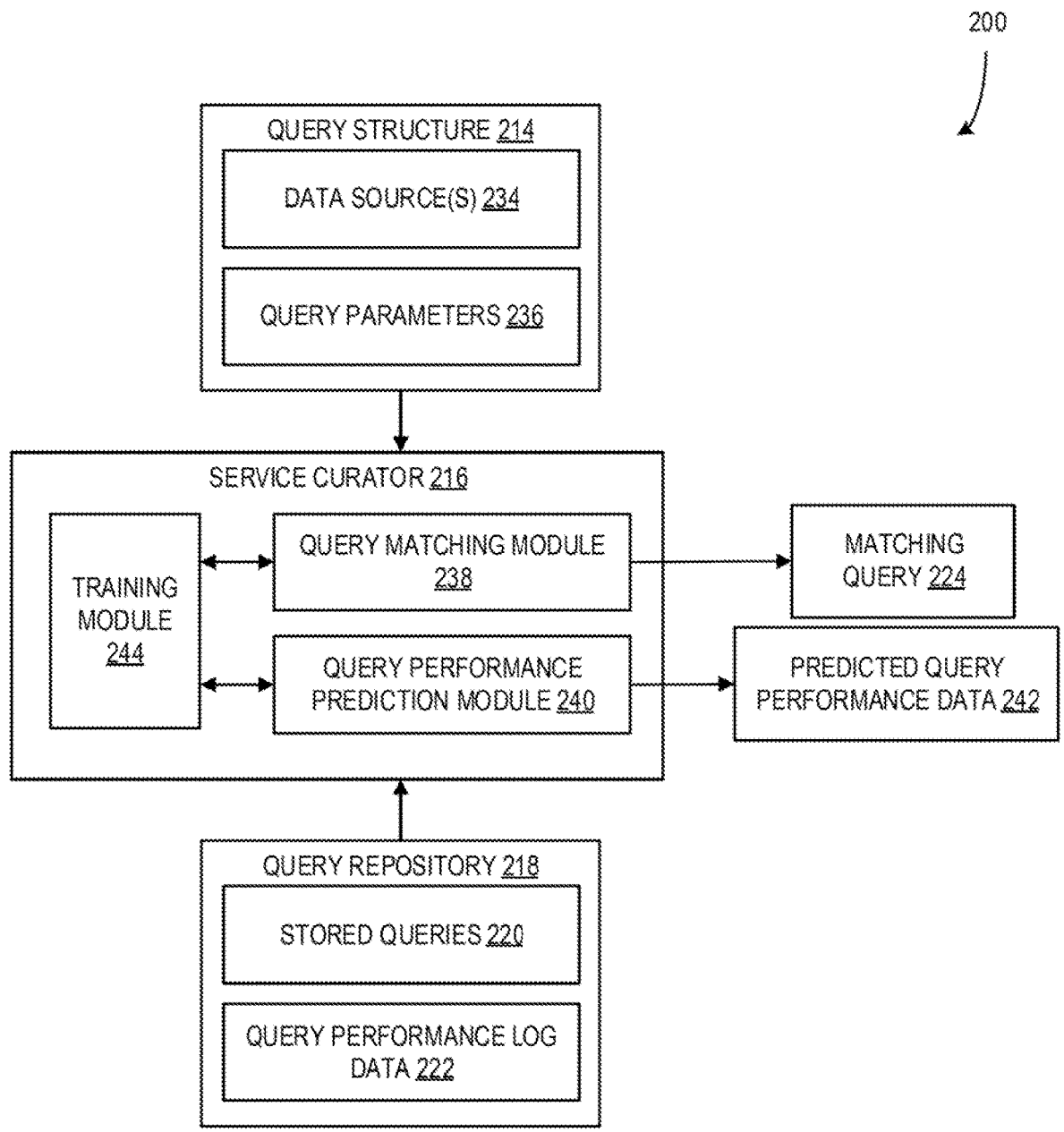
FIG. 2 is a block diagram illustrating a system configured for providing a matching query and predicted query performance data by a service curator according to an embodiment.

FIG. 2 is a block diagram illustrating a system 200 configured for providing a matching query 224 and predicted query performance data 242 by a service curator 216 according to an embodiment. The service curator 216 uses a query structure 214 and a query repository 218 to identify a matching query 224 that matches the query structure 214 using a query matching module 238 and to provide the predicted query performance data 242 associated with either the matching query 224 or a query generated from the query structure 214 using a query performance prediction module 240.

In some examples, the query matching module 238 collects or otherwise receives the query structure 214 from a service manager module (e.g., service manager 112), including a data source 234 and one or more query parameters 236, and compares that information to the stored queries 220 on the query repository 218, as described above. The data source(s) 234 include identifiers or names of one or more data sources that a query associated with the query structure 214 will target and the query parameters 236 include one or more query parameters (e.g., specific data fields to be obtained, specific data fields to change, and/or specific filters, limits, or thresholds to place on the query). For instance, in an SQL or other similar language query structure, the query parameters 236 may include the names of data fields that contain data values to be returned by the query, the names of data fields to be written to or otherwise updated by the query, and/or the names of data fields and/or other data values to compare to determine whether a particular data tuple is returned by the query (e.g., all tuples with a date field that is equal to or later than Jan. 1, 2019).

The stored queries 220 each include query structures that are compared to the query structure 214 by the query matching module 238. In some examples, the data source 234 of the query structure 214 is compared to the data source or sources of each of the stored queries 220 and the query parameters 236 of the query structure 214 are compared to the query parameters of each of the stored queries 220. If the data source(s) 234 and the query parameters 236 match exactly to one of the stored queries 220, that stored query 220 may be considered a matching query 224 by the query matching module 238.

Further, as described above, a matching query 224 may be identified in the stored queries 220 with less than an exact match of all data sources 234 and query parameters 236. In some examples, the query matching module 238 applies defined matching rules when comparing stored queries 220 with the query structure 214 to determine whether a stored query 220 is a matching query 224 or not. The matching rules may be configured to indicate a matching query 224 when a certain percentage or portion of a stored query 220 matches the query structure 214 (e.g., 90% of the data sources and query parameters of a stored query 220 matches the query structure 214). Alternatively, or additionally, the matching rules may be configured to classify or otherwise sort the stored queries 220 based on identified patterns in query structure that match or are substantially similar to such patterns in the query structure 214. For instance, if a stored query 220 targets the same data sources 234, returns the same data fields of the query parameters 236 in addition to other data fields, and filters the data tuples returned more broadly than indicated in the query parameters 236, the matching rules may indicate that the stored query 220 is a matching query 224, since it is configured to return substantially the same data (as well as some extra data) as a query generated directly from the query structure 214. Matching rules that are applied to match based on such patterns may be defined to focus on similarities in the data fields returned or affected by the query, similarities in how the data returned by the query is filtered and/or limited, similarities in the set of data sources accessed, and/or any combination thereof. It should be further understood that other types of matching rules may be used to identify patterns and/or classify stored queries for use in identifying matching queries without departing from the description herein.

The query performance prediction module 240 uses the query structure 214 and stored queries 220 and associated query performance log data 2220 from the query repository 218 to generate predicted query performance data 242 that can be provided to a user, as described above, enabling the user to evaluate the potential performance of a query before executing it. Such predicted query performance data 242 may include an amount of time required to complete the query, a quantity of data sources affected, a quantity of data tables affected, a quantity of data returned and/or updated, etc. If the predicted query performance data 242 indicates a query associated with the query structure 214 or a matching query 224 will take a substantial amount of time or occupy resources in a significant number of different data sources while executing, the user may, instead, decide to revise the query to narrow it or otherwise reduce the potential cost of running it.

In some examples, the query performance prediction module 240 uses query performance log data 222 from past performance of one or more of the stored queries 220. For instance, the query performance prediction module 240 may use the query performance log data 222 associated with past performance of any matching query or queries 224 to generate and provide the predicted query performance data 242. In cases where a matching query 224 from the stored queries 220 is tentatively selected for performance, the query performance prediction module 240 may be configured to only use query performance log data 222 associated with past executions of that matching query 224. Alternatively, if a new query is to be generated from the query structure 214 and used, the query performance prediction module 240 may be configured to use query performance log data 222 of any matching query 224 that may have been identified by the query matching module 238. Additionally, in such cases, the query performance prediction module 240 may use query performance log data 222 of stored queries 220 that are similar in query structure to the query structure 214 but that are not similar enough to be identified as matching queries 224 by the query matching module 238. Thus, the query performance log data 222 used for generating the predicted query performance data 242 by the query performance prediction module 240 may be from a broader subset of stored queries 220 than the subset of stored queries 220 that are identified as matching queries 224 by the query matching module 238.

In some examples, the query performance prediction module 240 calculates predicted query performance data 242 by calculating average values of the data from the identified set of query performance log data 222 (e.g., averaging execution time values of the query performance log data 222 to calculate a predicted execution time value for the predicted query performance data 242). Other portions of the query performance log data 222 may also be used to improve the accuracy of or otherwise provide context for the predicted query performance data 242 (e.g., the time of day or time of the week that the query is performed may affect the execution time of the query, and so those data values from the query performance log data 222 may be used to adjust the predicted execution time value).

Additionally, or alternatively, the query performance prediction module 240 may apply different weight values to the query performance log data 222 used to calculate the predicted query performance data 242 based on defined prediction rules. Such prediction rules are configured to weigh past (e.g., prior) log data values of the query performance log data 222 that more strongly indicate a predicted performance value of the predicted query performance data 242 more heavily than past log data values that less strongly indicate a predicted performance value. For instance, the prediction rules may be configured to more heavily or strongly weigh query performance log data 222 from stored queries 220 that more closely match the query structure 214 than query performance log data 222 from stored queries 220 that less closely match the query structure 214. Further, prediction rules may be configured to identify matching patterns within the query structure 214 and query structures of the stored queries 220 that may be used to assign weight values to past log data values that are used to calculate predicted performance values that are affected by the identified query structure patterns (e.g., accessing one or more of a particular set of data sources may have a substantial effect on execution time of a query, such that identifying the set of data sources in the query structure 214 causes past log data values of similar queries to heavily affect the predicted execution time value). It should be understood that the query performance prediction module 240 and any associated prediction rules may be configured to generate predicted query performance data 242 in other ways without departing from the description herein.

In some examples, the service curator 216 further includes a training module 244. The training module 244 is configured to train, using machine learning methods and/or techniques, the query matching module 238 to improve the identification of matching queries 224 and/or to train the query performance prediction module 240 to improve the calculation of the predicted query performance data 242.

The training module 244 is configured to train the query matching module 238 to improve the identification of matching queries 224 from the stored queries 220 based on feedback received regarding previously identified matching queries 224. For instance, when a matching query 224 is provided to a user for evaluation, the user may confirm or deny that the matching query 224 is sufficiently close to the query structure 214. In some cases, when the user denies that the matching query 224 is sufficiently close, that denial may be used as feedback to adjust the query matching module 238 to narrow or tighten the range in which a matching query 224 is identified from the stored queries 220 (e.g., a percentage threshold of matching query parameters is increased). Alternatively, or additionally, narrowing the range of the query matching module 238 may include adjusting the operation of specific matching rules of the query matching module 238 that were used when the module 238 identified the matching query 224 that has been denied by the user.

Further feedback values may include other information provided by the user. For instance, the user may be prompted to point out specific parameters or patterns in the matching query 224 that render the matching query 224 unacceptable with respect to the query structure 214. Such feedback may enable the training module 244 to adjust the query matching module 238 and any associated matching rules to specifically improve matching by the module 238 based on those specific parameters or patterns.

Additionally, or alternatively, the training module 244 is configured to train the query performance prediction module 240 to improve the calculation of predicted query performance data 242 from the query performance log data 222 based on feedback received regarding previously predicted query performance data 242. For instance, when a query has been performed and log data has been stored as query performance log data 222, the predicted query performance data 242 that was calculated for that query may be compared to the actual performance log data and the difference between the prediction and actual data may be used as feedback for training the query performance prediction module 240. For instance, if the difference between a predicted performance data value and an actual performance data value is significant enough, that may be considered feedback that indicates that the thresholds and/or rules used to predict the predicted performance value should be adjusted or changed (e.g., prediction rules of the query performance prediction module 240 may be adjusted to apply greater or lesser weight values to the past logged data values used to predict the predicted performance value).

The training of the query matching module 238 and/or the query performance prediction module 240 and associated adjustments made to those modules may be based on analysis of the feedback as described herein and, in some examples, the training and/or adjustment of the modules 238 and 240 is performed using deep learning classification algorithms and/or other machine learning techniques. In some examples, the training module 244 includes a machine learning module that comprises a trained regressor such as a random decision forest, a directed acyclic graph, a support vector machine, a convolutional neural network or other neural network, or another trained regressor. Such a trained regressor may be trained using the feedback data described above. It should further be understood that the machine learning module, in some examples, operates according to machine learning principles and/or techniques known in the art without departing from the systems and/or methods described herein.

In an example, the machine learning module of the training module 244 makes use of training data pairs when applying machine learning techniques and/or algorithms to the rules of the query matching module 238 and/or the query performance prediction module 240. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments of the rules of modules 238 and/or 240 according to machine learning techniques and/or algorithms.

Figure 3:
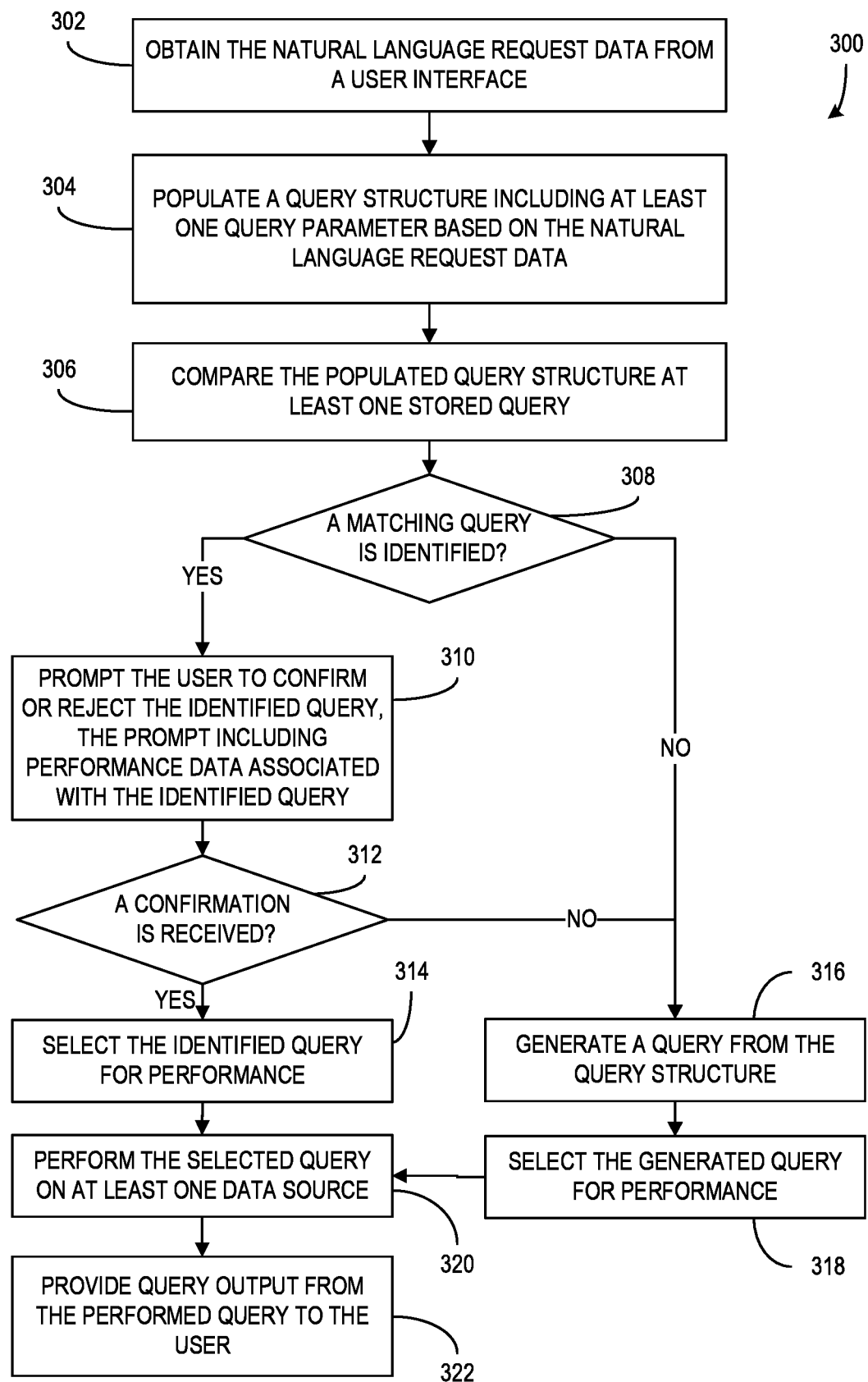
FIG. 3 is a flow chart illustrating a method of performing a selected query based on a user's natural language request data and providing associated query output according to an embodiment.

FIG. 3 is a flow chart illustrating a method 300 of performing a selected query based on a user's natural language request data and providing associated query output according to an embodiment. In some examples, the method 300 is performed on a system configured to provide the described data query services, such as system 100 of FIG. 1. At 302, natural language request data is obtained from a user interface. In some examples, obtaining the natural language request data includes a natural language engine (e.g., natural language engine 108) that is configured to communicate with a user on the user interface in a question-and-answer session, wherein at least some of the questions asked of the user by the natural language engine are in response to answers that have been previously provided by the user. An example question-and-answer session is described in greater detail below with respect to FIGS. 5A-5D. Alternatively, or additionally, the natural language request data may be obtained in other ways without departing from the description herein (e.g., a file that includes a natural language description of a requested query).

At 304, a query structure is populated based on the natural language request data, wherein the query structure includes at least one query parameter described in the natural language request data. In some examples, the query structure is populated by a service manager module (e.g., service manager 112) as described herein. The population of the query structure may include analysis of the natural language request data based on both the words and/or phrases provided by the user and on the context of the question or questions to which words and/or phrases were provided as answers (e.g., if the natural language engine asked the user to provide a type of data for the query to return in the results, the answer(s) provided to that question by the user and/or query syntax associated with the answer(s) may be populated to a portion of the query structure associated with data to be returned by the query). Conversion of the natural language request data to query syntax and the population of the query structure therewith may be performed in other known ways without departing from the description herein.

At 306, the populated query structure is compared to at least one stored query and, if a matching query is identified at 308, the process proceeds to 310. Alternatively, if a matching query is not identified at 308, the process proceeds to 316. In some examples, comparing the populated query structure to stored queries is performed by a service curator module (e.g., service curator 116, 216). Identifying matching queries may include matching some or all query parameters of the populated query structure (e.g., matching more than a defined percentage threshold of query parameters or matching one or more patterns of multiple query parameters). Further, identifying matching queries may include using defined matching rules of a query matching module (e.g., query matching module 238) of the service curator as described herein.

At 310, based on a matching query being identified at 308, the user is prompted to confirm or reject the identified query, wherein the prompt includes performance data associated with the identified query. In some examples, the performance data includes performance data gathered based on past performances of the identified query. Alternatively, or additionally, the performance data may include predicted performance data generated by a service curator module and based on the past performance data of the identified query and/or other similar or related queries, as described herein. The prompt includes the some or all of the structure and parameters of the identified query for evaluation by the user in addition to the performance data.

If, at 312, a confirmation of the identified query is received from the user, the identified query is selected for performance at 314. Alternatively, if no confirmation is received from the user (e.g., a rejection is received from the user or the user lets the prompt time out), the process proceeds to 316.

At 316, a query is generated from the populated query structure and, at 318, the generated query is selected for performance. Generating the query from the query structure may include transferring the query structure into a compatible file, updating or otherwise changing a format of the query structure to a compatible format, or the like. Generating a query from the query structure may be performed in other ways without departing from the description herein.

At 320, the selected query is performed on at least one data source. In some cases, the selected query is the identified query from 314 and, in other cases, it is the generated query from 318. In some examples, the performance of the selected query is executed, at least in part, by a service manager (e.g., service manager 112). The service manager creates a query microservice (e.g., query microservice 126) specifically for the selected query and the query microservice then executes the query on one or more target data sources, as described herein.

At 322, after the selected query is performed, query output from the query is provided to the user. In some examples, the query output is provided to the user via the user interface (e.g., the chat interface through which the user provided the natural language request data). Alternatively, or additionally, the query output may be provided in a file or other data format, which may be a default format or a user-specified format (e.g., an EXCEL file, a comma-separated-value (CSV) file, etc.).

Figure 4:
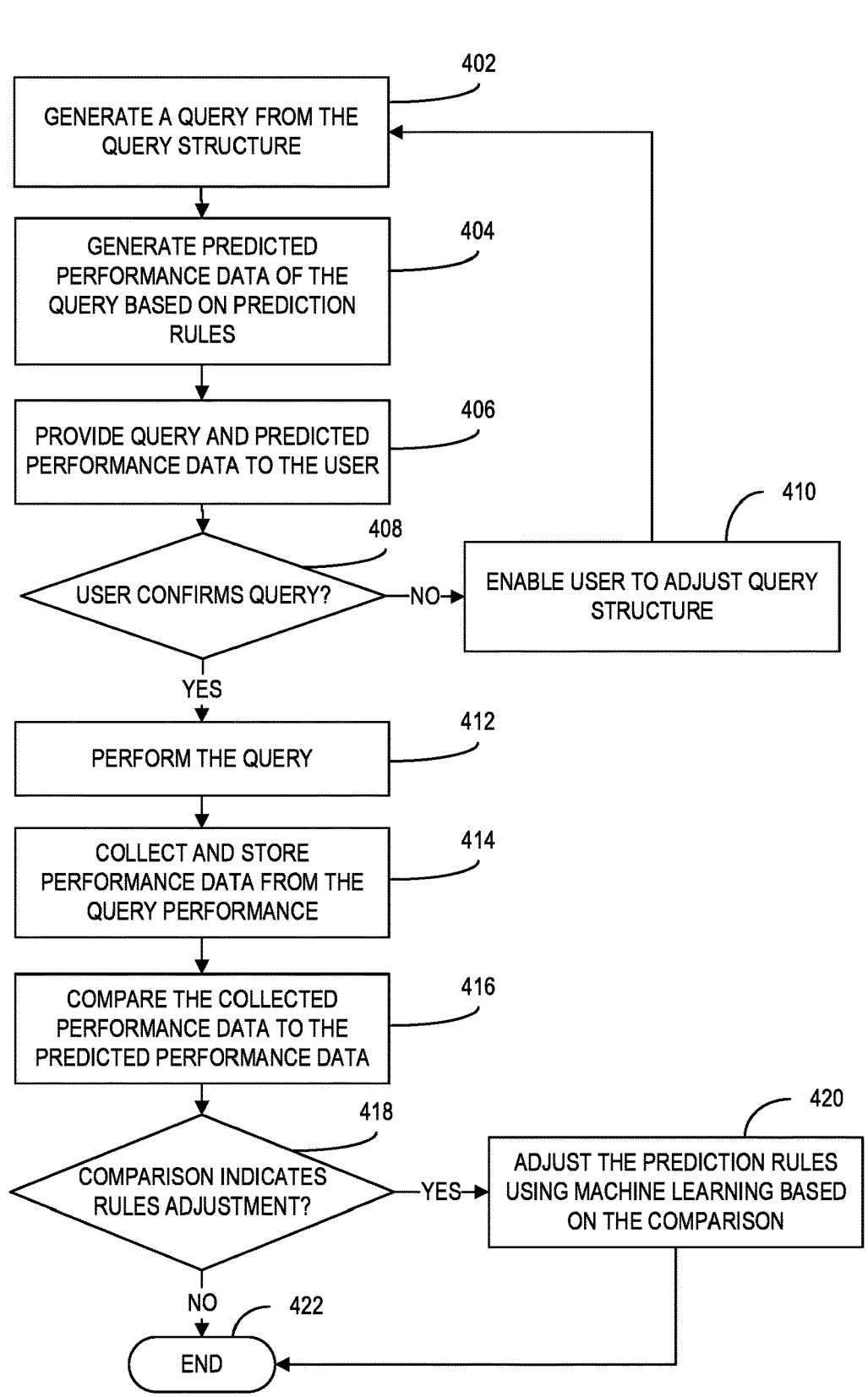
FIG. 4 is a flow chart illustrating a method of generating a query, providing predicted performance data associated with the query to the user, and enabling the user to adjust the query prior to performance according to an embodiment.

FIG. 4 is a flow chart illustrating a method 400 of generating a query, providing predicted performance data associated with the query to the user, and enabling the user to adjust the query prior to performance according to an embodiment. In some examples, the method 400 is performed on a system configured to provide the described data query services, such as system 100 of FIG. 1. At 402, a query is generated from the query structure. It should be understood that generating a query from the query structure at 402 is performed after 308 or 312 of FIG. 3 as described above.

At 404, predicted performance data of the query is generated based on prediction rules. In some examples, the generation of the predicted performance data is performed by a query performance prediction module (e.g., query performance prediction module 240) of a service curator module (e.g., service curator 216) as described above with respect to FIG. 2. At 406, the query and the predicted performance data is provided to the user. For instance, the query and predicted performance data may be displayed in a chat interface (e.g., chat interface 106) for evaluation by the user.

If, at 408, the user confirms the query based on the provided information, the process proceeds to 412. Alternatively, if the user does not confirm the query at 408, the process proceeds to 410, wherein the user is enabled to adjust the query structure. In some examples, the user may be prompted to provide additional natural language request data through one or more questions from a natural language engine as described herein. Alternatively, or additionally, the user may be provided an interface that enables the user to edit the query directly or otherwise adjust the query structure in an effort to improve the predicted performance of the query. Then, the process returns to 402, where a new query is generated from the adjusted query structure.

The user may continue making adjustments to the query structure, generating a new query, and generating new predicted performance data until they are satisfied and confirm the query at 408. Then, at 412, the confirmed query is performed as described herein. At 414, performance data is collected and stored from the performance of the query. In some examples, the performance data includes query performance log data (e.g., query performance log data 122) that is stored in a query repository (e.g., query repository 118) as described herein.

The collected performance data is compared to the predicted performance data at 416 and, if the comparison indicates a rules adjustment at 418, prediction rules used to generate the predicted performance data are adjusted based on the comparison at 420. In some examples, the adjustment of the prediction rules is performed by a training module (e.g., training module 244) in conjunction with the query performance prediction module (e.g., query performance prediction module 240) of a service curator module as described above.

If the comparison does not indicate a rules adjustment at 418, the process ends at 422. Alternatively, after the prediction rules are adjusted at 4220, the process ends at 422.

Additional Example Scenarios

Aspects of the disclosure enable various additional scenarios, such as next described.

In an example, a system includes a service platform that provides a chat interface to a user as described herein. FIGS. 5A-D illustrate the chat interface 500A-500D including a question-and-answer session between the user and a natural language engine enabling the user to provide natural language request data for use in a query according to an embodiment. The chat interface 500A-500D includes questions and/or other messages from the natural language engine on the left side or as dialog boxes within the chat interface (e.g., messages 502, 510, and 514) and responses from the user on the right side (e.g., messages 504, 508, 512, and 516), as well as a message prompt section 516 in which the user can type or otherwise enter responses to the engine's questions. Upon initiation of the chat interface 500A, the engine asks the user about data the user wants in a query in message 502. The user indicates that they want "transaction data" in message 504. In response to that answer, the engine is configured to display dialog box 506 to determine whether the user knows which fields they are specifically looking for. The choices of "yes" or "no" in the dialog box 506 enable the user to provide one of a set of possible defined answers to which the engine can specifically respond based on defined logic. The user responds that they do know the fields they need in message 508. In message 510, the engine asks the user to provide the types of output fields they want in their query and, in message 512, the user answers with a list of fields and/or types of fields. Then, the engine asks the user to provide a timeframe for the data to be queried in message 514.

Figure 5A:
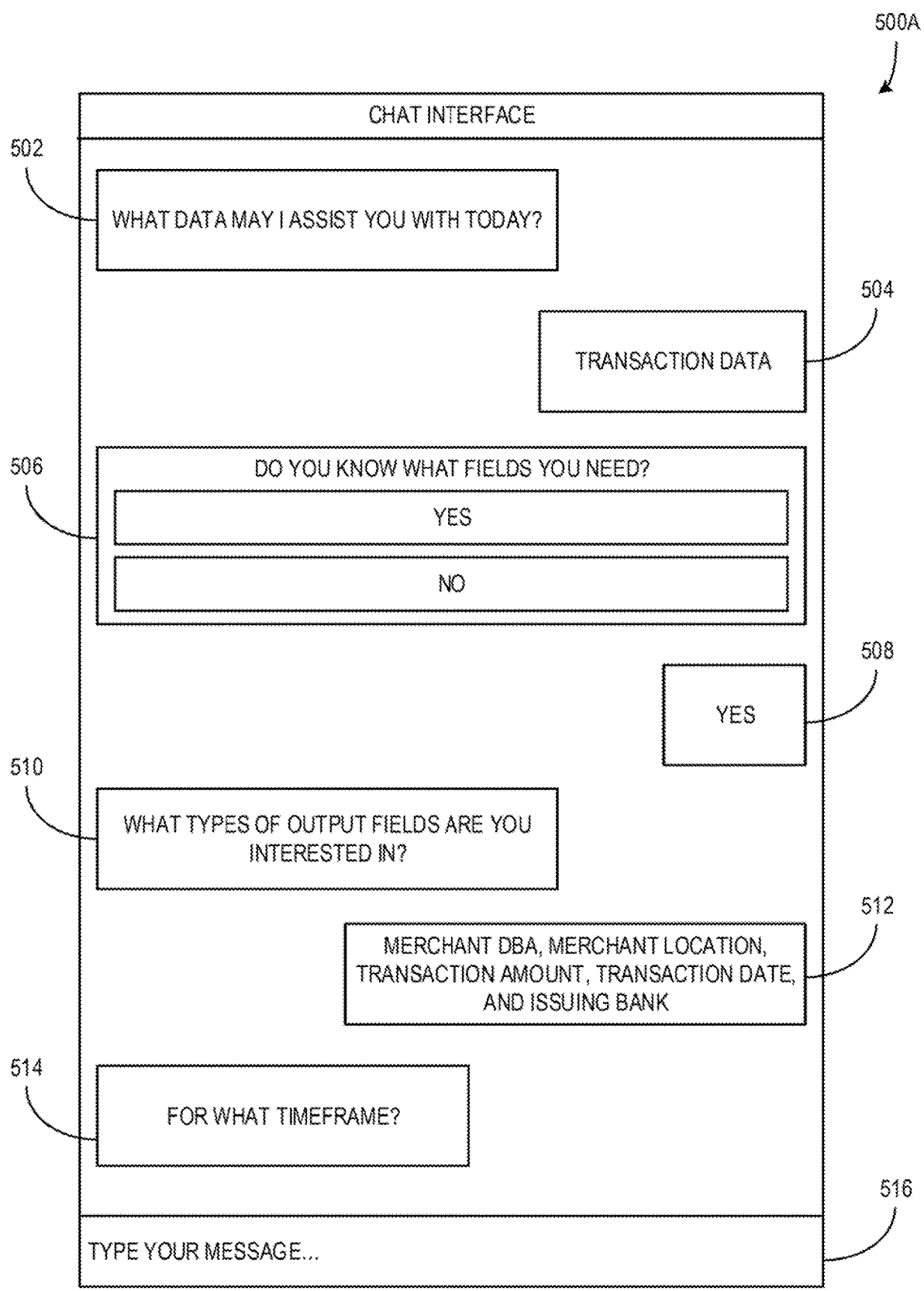
FIGS. 5A-D illustrate a chat interface including a question-and-answer session between a user and a natural language engine enabling the user to provide natural language request data for use in a query according to an embodiment.
Figure 5B:
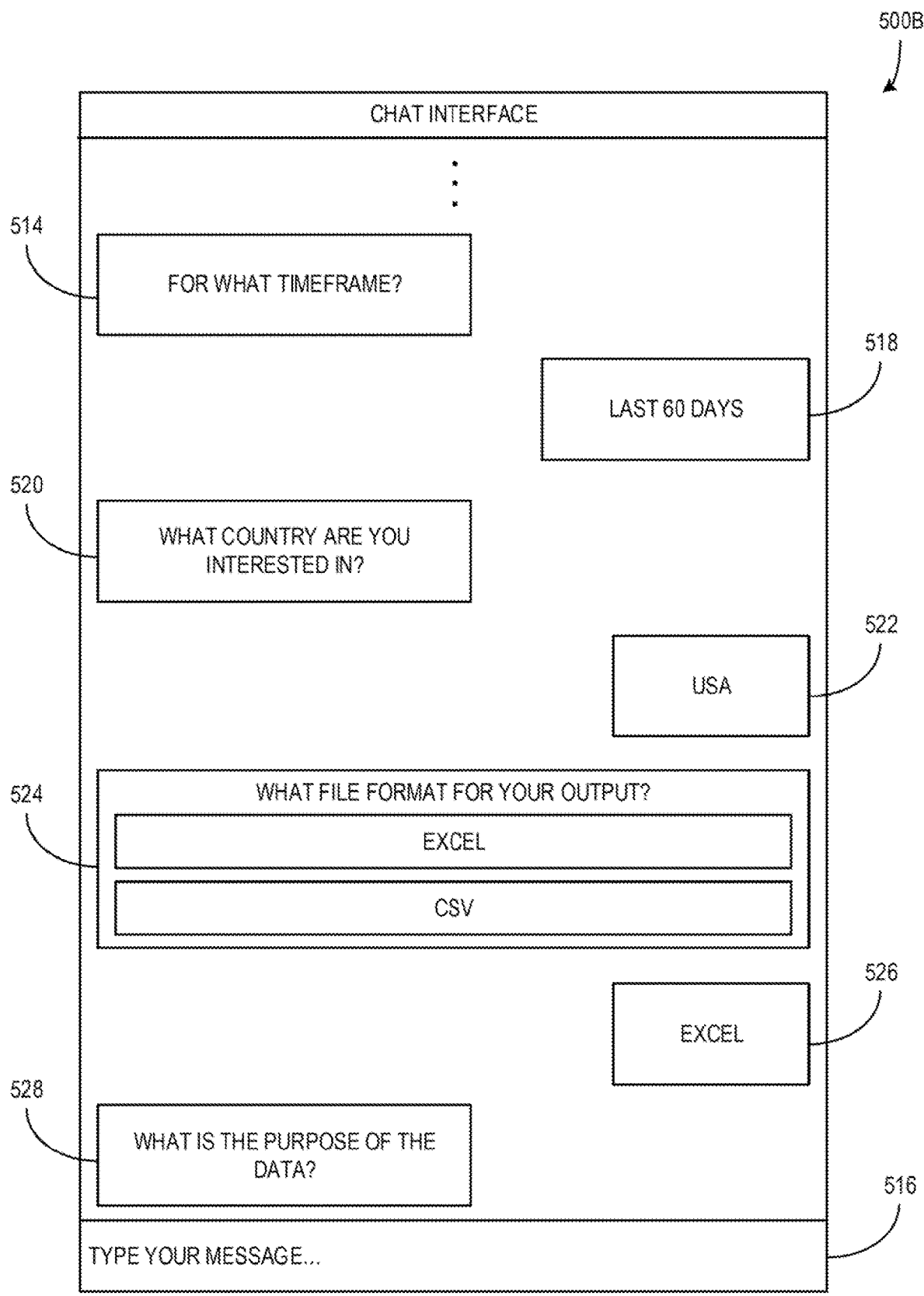

The chat interaction between the user and the natural language engine continues in FIG. 5B. The illustrated chat interface 500B includes the message 514 asking the user to provide a timeframe for their query. The user indicates they want the query to search for data from the last 60 days in message 518. Then, the engine asks the user to provide a country in message 520 and the user indicates that the query should apply to the USA in message 522. The engine then asks the user to provide the file format in which the want the output of the query to be provided in dialog box 524. The options include EXCEL format or CSV format, though in other examples, other formats may be provided as options. The user selects EXCEL format in message 526. In message 528, the engine asks the user to provide a purpose of the queried data. Such context data or metadata may be used later to provide other users context and/or enable the matching of the query to other queries.

Figure 5C:
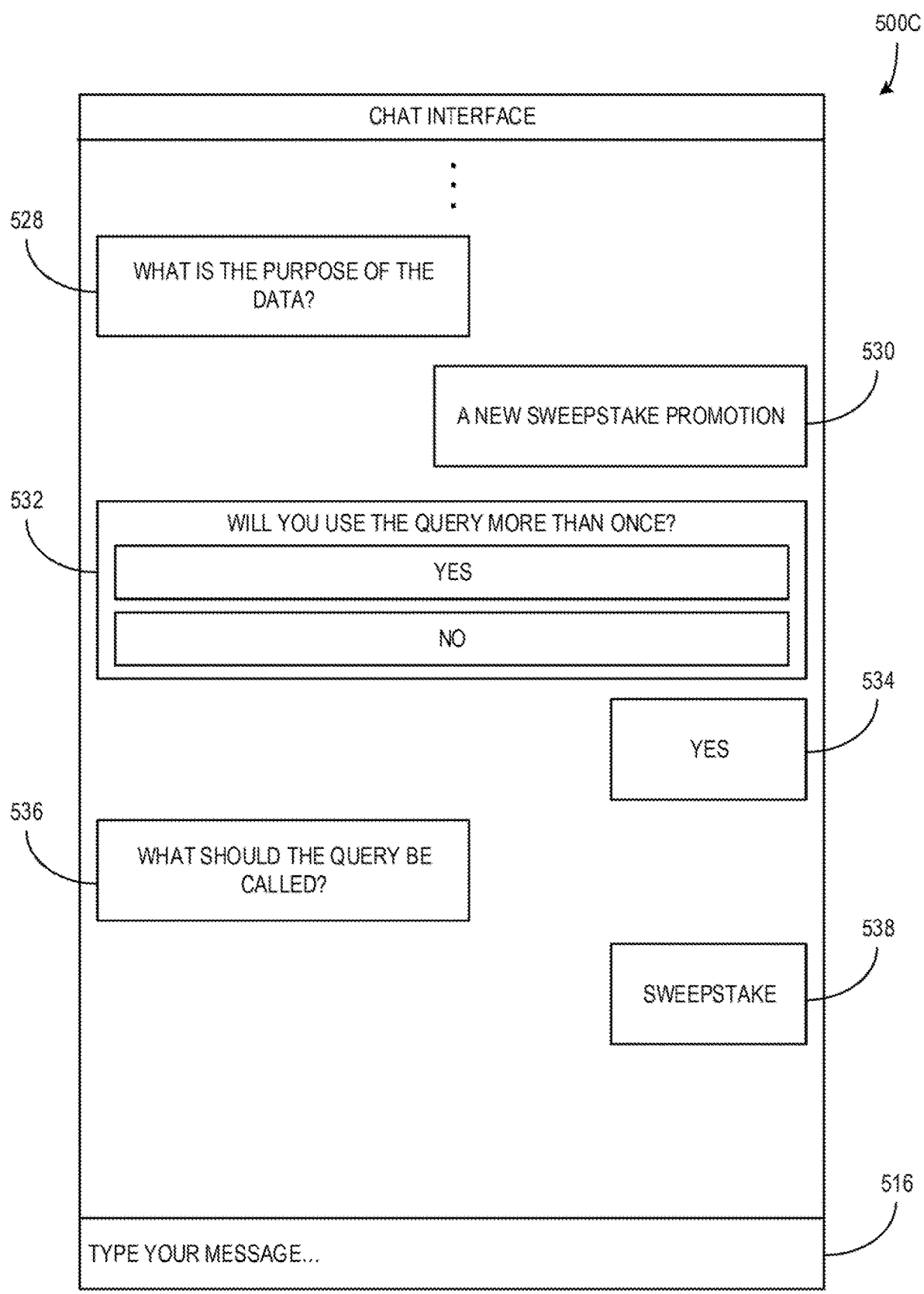

The chat interaction between the user and the natural language engine continues in FIG. 5C. The illustrated chat interface 500C includes the message 528 asking the user for the purpose of the queried data. In message 530, the user responds that the query will be used for a new sweepstake promotion. The engine then provides a dialog box 532 asking the user whether the query will be used more than once. The system can use the response to this dialog box to determine whether to store the resulting query in a query repository. The user responds "yes" in message 534 and the engine asks what the query should be called in message 536. The user provides the query name "sweepstake" in message 538. The engine may then store or otherwise cause the resulting query to later be stored in the repository using the provided query name.

Figure 5D:
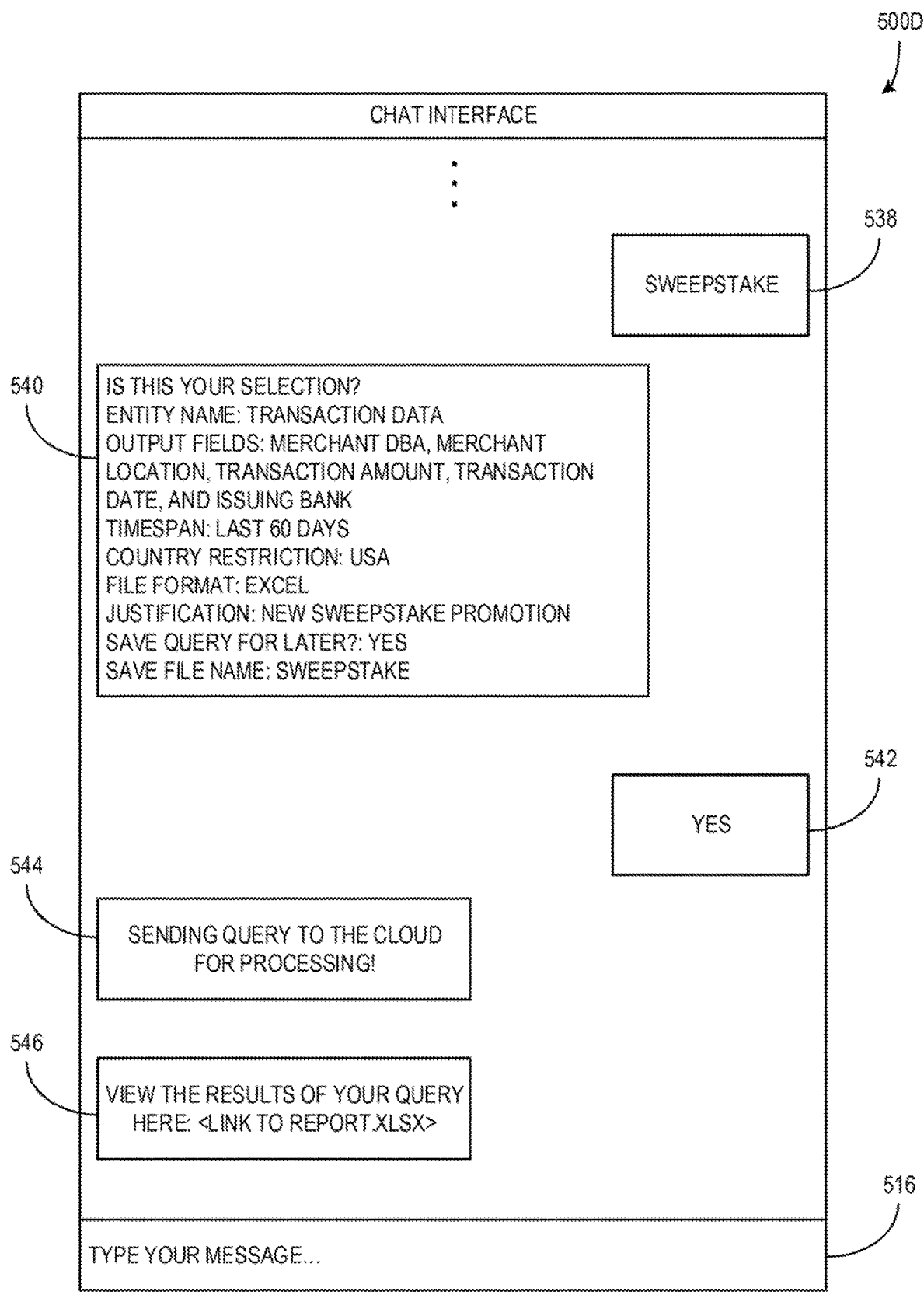

The chat interaction between the user and the natural language engine continues in FIG. 5D. The illustrated chat interface 500D includes the message 538 providing the query name "sweepstake" to the natural language engine. The engine provides a message that includes the natural language request data provided by the user throughout the chat interaction and asks the user to confirm the information in message 540. The user then confirms the natural language request data in message 542 and the engine notifies the user that the query associated with the natural language request data is being sent "to the cloud for processing" in message 544. During this process, the natural language request data may be converted to a query to be performed based on natural language processing, as described herein. In alternative examples, the engine may further engage with the user in the chat interaction by providing potential matching queries and asking the user to confirm or reject the matching queries prior to generating and performing a new query. After the query is performed, the engine provides a link to the results of the performed query in message 546, and the user is enabled to select the link to retrieve the results in the selected EXCEL format.

Exemplary Operating Environment

Figure 6:
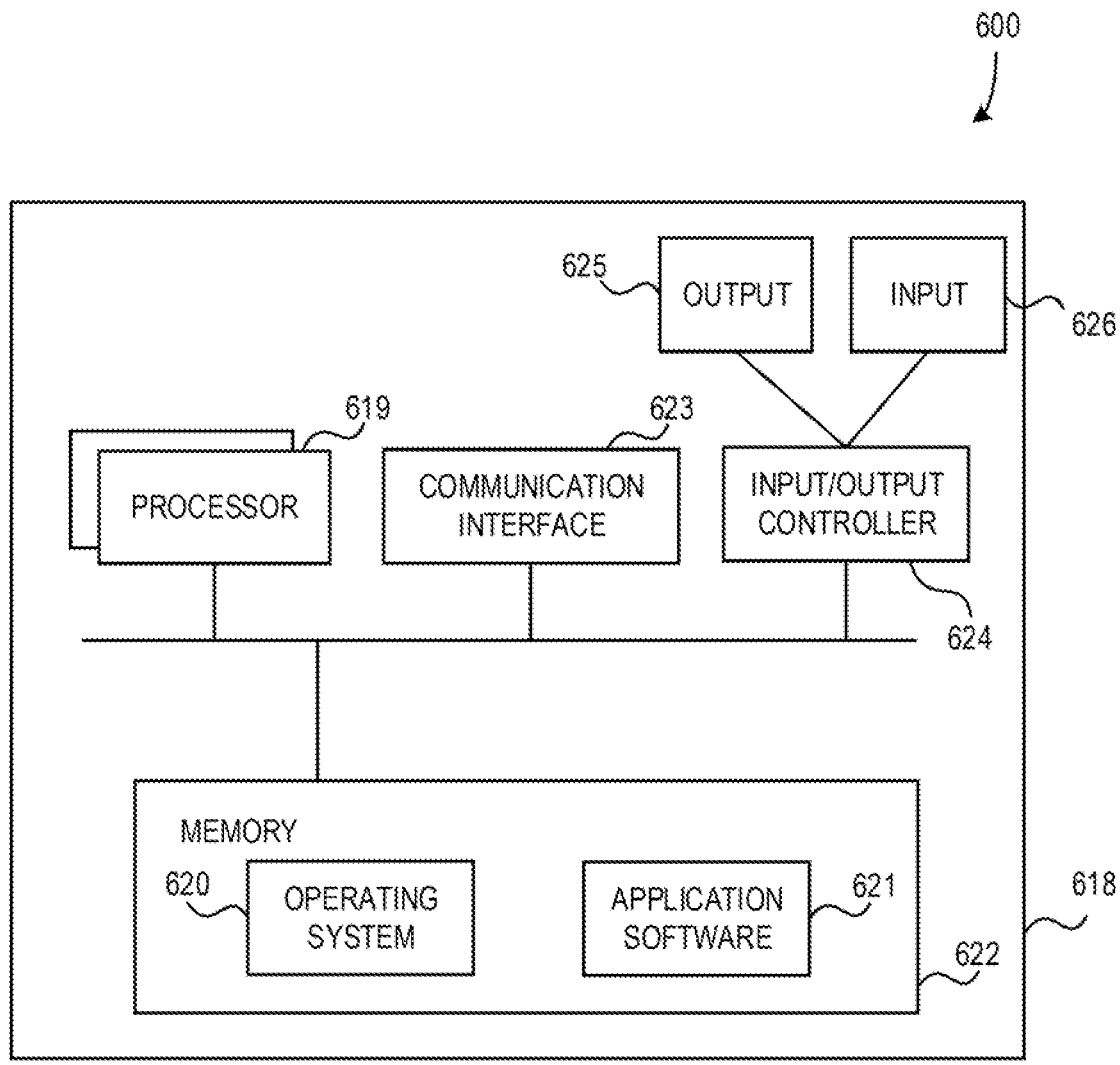
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, generating a query microservice for performing a query based on user-provided natural language data as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and nonvolatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: obtain the natural language request data from a user interface; populate a query structure including at least one query parameter based on the natural language request data; compare the populated query structure to at least one stored query; based on identifying a stored query that matches the query structure, prompt the user, via the user interface, to confirm or reject that the identified query be performed, wherein prompting the user includes providing performance data associated with at least one past performance of the identified query; based on receiving a confirmation of the identified query from the user, select the identified query for performance; based on receiving a rejection of the identified query from the user or failing to identify a stored query that matches the query structure, generate a query based on the query structure; based on generating the query based on the query structure, select the generated query for performance; perform the selected query on at least one data source; and provide query output from the performed query to the user via the user interface.

A computerized method for providing a data query service to a user based on natural language request data, the method comprising: obtaining, by a processor, the natural language request data from a user interface; populating, by the processor, a query structure including at least one query parameter based on the natural language request data; comparing, by the processor, the populated query structure to at least one stored query; based on identifying a stored query that matches the query structure, prompting, by the processor, the user, via the user interface, to confirm or reject that the identified query be performed, wherein prompting the user includes providing performance data associated with at least one past performance of the identified query; based on receiving a confirmation of the identified query from the user, selecting, by the processor, the identified query for performance; based on receiving a rejection of the identified query from the user or failing to identify a stored query that matches the query structure, generating, by the processor, a query based on the query structure; based on generating the query based on the query structure, selecting, by the processor, the generated query for performance; performing, by the processor, the selected query on at least one data source; and providing, by the processor, query output from the performed query to the user via the user interface.

One or more non-transitory computer storage media having computer-executable instructions for providing a data query service to a user based on natural language request data that, upon execution by a processor, cause the processor to at least: obtain the natural language request data from a user interface; populate a query structure including at least one query parameter based on the natural language request data; compare the populated query structure to at least one stored query; based on identifying a stored query that matches the query structure, prompt the user, via the user interface, to confirm or reject that the identified query be performed, wherein prompting the user includes providing performance data associated with at least one past performance of the identified query; based on receiving a confirmation of the identified query from the user, select the identified query for performance; based on receiving a rejection of the identified query from the user or failing to identify a stored query that matches the query structure, generate a query based on the query structure; based on generating the query based on the query structure, select the generated query for performance; perform the selected query on at least one data source; and provide query output from the performed query to the user via the user interface.

Alternatively, or in addition to the other examples described herein, examples include any combination of the following:

receiving, by the processor, a request for computing assets associated with the service; wherein providing the subset of computing assets includes providing the subset of computing assets in response to the received request.

further comprising: applying at least one access control rule to the selected query based on an identifier of the user prior to performing the selected query, wherein performing the selected query is based on the applied at least one access control rule being satisfied.

further comprising: based on generating the query based on the query structure, providing, to the user, predicted performance data of the generated query based on stored query performance log data of stored queries; wherein selecting the generated query to be perform is further based on receiving a confirmation of the generated query by the user in response to the predicted performance data.

wherein the predicted performance data is generated based on prediction rules; and further comprising: based on performing the selected query on the at least one data source, collecting performance data associated with the performance of the selected query; determining at least one difference between the predicted performance data and the collected performance data; and adjusting the prediction rules based on the determined at least one difference using machine learning.

wherein performing the selected query includes generating a query microservice configured for performing the selected query and causing the generated query microservice to perform the selected query.

wherein obtaining the natural language request data from the user includes engaging in a question-and-answer session based on natural language processing.

wherein the at least one query parameter includes one or more of the following: a data field to be obtained, a data field to change, and filters to place on the query.

wherein at least one of the at least one query parameter is associated with financial data and performing the selected query on the at least one data source includes accessing financial data on the at least one data source.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for obtaining, by a processor, the natural language request data from a user interface; exemplary means for populating, by the processor, a query structure including at least one query parameter based on the natural language request data; exemplary means for comparing, by the processor, the populated query structure to at least one stored query; based on identifying a stored query that matches the query structure, exemplary means for prompting, by the processor, the user, via the user interface, to confirm or reject that the identified query be performed, wherein prompting the user includes providing performance data associated with at least one past performance of the identified query; based on receiving a confirmation of the identified query from the user, exemplary means for selecting, by the processor, the identified query for performance; based on receiving a rejection of the identified query from the user or failing to identify a stored query that matches the query structure, exemplary means for generating, by the processor, a query based on the query structure; based on generating the query based on the query structure, exemplary means for selecting, by the processor, the generated query for performance; exemplary means for performing, by the processor, the selected query on at least one data source; and exemplary means for providing, by the processor, query output from the performed query to the user.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing a data query service to a user based on natural language request data, the system comprising:
   at least one processor; and
   at least one memory comprising computer program code, the at least one memory and the computer program code configured to, with the at least one processor, cause the at least one processor to:
   obtain the natural language request data from a user interface;
   populate a query structure including at least one query parameter based on the natural language request data;
   compare the populated query structure to at least one stored query;
   based on identifying a stored query that matches the query structure, prompt the user, via the user interface, to confirm or reject that the identified query be performed, wherein prompting the user includes providing performance data associated with at least one past performance of the identified query;
   based on receiving a confirmation of the identified query from the user, select the identified query for performance;
   based on receiving a rejection of the identified query from the user or failing to identify a stored query that matches the query structure, generate a query based on the query structure and select the generated query for performance;
   perform the selected query on at least one data source; and
   provide query output from the performed query to the user via the user interface.

2. The system of claim 1, wherein the at least one memory and the computer program code are configured to, with the at least one processor, further cause the at least one processor to:
   apply at least one access control rule to the selected query based on an identifier of the user prior to performing the selected query, wherein performing the selected query is based on the applied at least one access control rule being satisfied.

3. The system of claim 1, wherein the at least one memory and the computer program code are configured to, with the at least one processor, further cause the at least one processor to:
   based on generating the query based on the query structure, provide, to the user, predicted performance data of the generated query based on stored query performance log data of stored queries; and
   wherein selecting the generated query to be perform is further based on receiving a confirmation of the generated query by the user in response to the predicted performance data.

4. The system of claim 3, wherein the predicted performance data is generated based on prediction rules; and
   wherein the at least one memory and the computer program code are configured to, with the at least one processor, further cause the at least one processor to:
   based on performing the selected query on the at least one data source, collect performance data associated with the performance of the selected query;
   determine at least one difference between the predicted performance data and the collected performance data; and adjust the prediction rules based on the determined at least one difference using machine learning.

5. The system of claim 1, wherein performing the selected query includes generating a query microservice configured for performing the selected query and causing the generated query microservice to perform the selected query.

6. The system of claim 1, wherein obtaining the natural language request data from the user includes engaging in a question-and-answer session based on natural language processing.

7. The system of claim 1, wherein the at least one query parameter includes one or more of the following: a data field to be obtained, a data field to change, and filters to place on the query.

8. A computerized method for providing a data query service to a user based on natural language request data, the method comprising:
- obtaining, by a processor, the natural language request data from a user interface;
- populating, by the processor, a query structure including at least one query parameter based on the natural language request data;
- comparing, by the processor, the populated query structure to at least one stored query;
- based on identifying a stored query that matches the query structure, prompting, by the processor, the user, via the user interface, to confirm or reject that the identified query be performed, wherein prompting the user includes providing performance data associated with at least one past performance of the identified query;
- based on receiving a confirmation of the identified query from the user, selecting, by the processor, the identified query for performance;
- based on receiving a rejection of the identified query from the user or failing to identify a stored query that matches the query structure, generating, by the processor, a query based on the query structure and selecting, by the processor, the generated query for performance;
- performing, by the processor, the selected query on at least one data source; and
- providing, by the processor, query output from the performed query to the user via the user interface.

9. The method of claim 8, further comprising:
applying at least one access control rule to the selected query based on an identifier of the user prior to performing the selected query, wherein performing the selected query is based on the applied at least one access control rule being satisfied.

10. The method of claim 8, further comprising:
- based on generating the query based on the query structure, providing, to the user, predicted performance data of the generated query based on stored query performance log data of stored queries; and
- wherein selecting the generated query to be perform is further based on receiving a confirmation of the generated query by the user in response to the predicted performance data.

11. The method of claim 10, wherein the predicted performance data is generated based on prediction rules; and further comprising:
- based on performing the selected query on the at least one data source, collecting performance data associated with the performance of the selected query;
- determining at least one difference between the predicted performance data and the collected performance data; and adjusting the prediction rules based on the determined at least one difference using machine learning.

12. The method of claim 8, wherein performing the selected query includes generating a query microservice configured for performing the selected query and causing the generated query microservice to perform the selected query.

13. The method of claim 8, wherein obtaining the natural language request data from the user includes engaging in a question-and-answer session based on natural language processing.

14. The method of claim 8, wherein the at least one query parameter includes one or more of the following: a data field to be obtained, a data field to change, and filters to place on the query.

15. The method of claim 8, wherein at least one of the at least one query parameter is associated with financial data and performing the selected query on the at least one data source includes accessing financial data on the at least one data source.

16. One or more non-transitory computer storage media having computer-executable instructions for providing a data query service to a user based on natural language request data that, upon execution by a processor, cause the processor to at least:
- obtain the natural language request data from a user interface;
- populate a query structure including at least one query parameter based on the natural language request data;
- compare the populated query structure to at least one stored query;
- based on identifying a stored query that matches the query structure, prompt the user, via the user interface, to confirm or reject that the identified query be performed, wherein prompting the user includes providing performance data associated with at least one past performance of the identified query;
- based on receiving a confirmation of the identified query from the user, select the identified query for performance;
- based on receiving a rejection of the identified query from the user or failing to identify a stored query that matches the query structure, generate a query based on the query structure and select the generated query for performance;
- perform the selected query on at least one data source; and
- provide query output from the performed query to the user via the user interface.

17. The one or more computer storage media of claim 16, wherein the computer-executable instructions, upon execution by the processor, further cause the processor to at least:
apply at least one access control rule to the selected query based on an identifier of the user prior to performing the selected query, wherein performing the selected query is based on the applied at least one access control rule being satisfied.

18. The one or more computer storage media of claim 16, wherein the computer-executable instructions, upon execution by the processor, further cause the processor to at least:
- based on generating the query based on the query structure, provide, to the user, predicted performance data of the generated query based on stored query performance log data of stored queries; and
- wherein selecting the generated query to be perform is further based on receiving a confirmation of the generated query by the user in response to the predicted performance data.

19. The one or more computer storage media of claim 18, wherein the predicted performance data is generated based on prediction rules; and wherein the computer-executable instructions, upon execution by the processor, further cause the processor to at least:

based on performing the selected query on the at least one data source, collect performance data associated with the performance of the selected query;

determine at least one difference between the predicted performance data and the collected performance data; and adjust the prediction rules based on the determined at least one difference using machine learning.

20. The one or more computer storage media of claim 16, wherein performing the selected query includes generating a query microservice configured for performing the selected query and causing the generated query microservice to perform the selected query.

\* \* \* \* \*